United States Patent
Kolar

(10) Patent No.: US 10,687,670 B2
(45) Date of Patent: Jun. 23, 2020

(54) SHEAR BLADE ASSEMBLY FOR A BLENDER

(71) Applicant: VITA-MIX MANAGEMENT CORPORATION, Olmsted Township, OH (US)

(72) Inventor: David J. Kolar, Stow, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 1199 days.

(21) Appl. No.: 14/803,741

(22) Filed: Jul. 20, 2015

(65) Prior Publication Data

US 2016/0015218 A1    Jan. 21, 2016

Related U.S. Application Data

(60) Provisional application No. 62/026,304, filed on Jul. 18, 2014.

(51) Int. Cl.
*A47J 43/00* (2006.01)
*A47J 43/07* (2006.01)
*A47J 43/046* (2006.01)

(52) U.S. Cl.
CPC ......... *A47J 43/0722* (2013.01); *A47J 43/046* (2013.01)

(58) Field of Classification Search
CPC .. A47J 43/044; A47J 43/0705; A47J 43/0711; A47J 43/0727; A47J 43/0722; A47J 2043/04454
USPC .............................................. 241/46.17, 89.3
See application file for complete search history.

(56) References Cited

U.S. PATENT DOCUMENTS

| | | | |
|---|---|---|---|
| 1,951,684 A * | 3/1934 | Wells | D21D 5/06 241/74 |
| 3,894,694 A | 7/1975 | Rothman | |
| 4,773,599 A * | 9/1988 | Lynch | A47J 19/00 209/283 |
| 4,773,765 A | 9/1988 | Erskine | |
| 5,184,783 A * | 2/1993 | Hockmeyer | B02C 17/168 241/172 |
| 5,636,923 A * | 6/1997 | Nejat-Bina | B01F 7/00908 241/74 |

(Continued)

FOREIGN PATENT DOCUMENTS

| CN | 103381066 | 11/2013 |
|---|---|---|
| EP | 2659811 | 11/2013 |

OTHER PUBLICATIONS

Silverson, "Solutions for Your Toughest Mixing Applications in Food," chemeview.wordpress.com/category/silverson/page/2/, Accessed last accessed Jul. 20, 2015.

(Continued)

*Primary Examiner* — Faye Francis
(74) *Attorney, Agent, or Firm* — McDonald Hopkins LLC

(57) ABSTRACT

A blender system with a shearing blade assembly is shown and described. The blender system may include a container and a shear blending assembly attached thereto. The shear blending assembly may include a cutting blade, a shearing blade, a shear mechanism, and bearings operably coupled with a blending base. The shearing blade may force foodstuff through apertures of the shearing mechanism. The foodstuff may be drawn through a cut path of the cutting blade. The cutting blade may cut the foodstuff.

5 Claims, 9 Drawing Sheets

(56) References Cited

U.S. PATENT DOCUMENTS

| | | | | |
|---|---|---|---|---|
| 5,662,032 | A * | 9/1997 | Baratta | A47J 43/046 |
| | | | | 210/380.1 |
| 6,135,019 | A * | 10/2000 | Chou | A23N 1/00 |
| | | | | 366/205 |
| 6,595,121 | B1 * | 7/2003 | Chang Chien | A47J 43/0716 |
| | | | | 241/199.12 |
| 6,837,153 | B1 * | 1/2005 | Chang Chien | A47J 43/0722 |
| | | | | 241/199.12 |
| 7,263,926 | B2 * | 9/2007 | Chang Chien | A47J 43/0727 |
| | | | | 99/348 |
| 7,681,815 | B2 | 3/2010 | Obersteiner | |
| 8,672,250 | B2 | 3/2014 | Wilson | |
| 10,045,663 | B2 * | 8/2018 | Wu | A47J 19/02 |
| 10,334,986 | B2 * | 7/2019 | Gross | A23L 25/30 |
| 2002/0118597 | A1 * | 8/2002 | Korstvedt | B01F 7/1625 |
| | | | | 366/265 |
| 2004/0149148 | A1 * | 8/2004 | Lee | A23C 11/103 |
| | | | | 99/516 |
| 2006/0124536 | A1 * | 6/2006 | Guerrero | A47J 43/0716 |
| | | | | 210/473 |
| 2009/0260236 | A1 | 10/2009 | Lin | |

OTHER PUBLICATIONS

International Search Report for App. No. PCT/US 15/41138, dated Dec. 18, 2015.

* cited by examiner

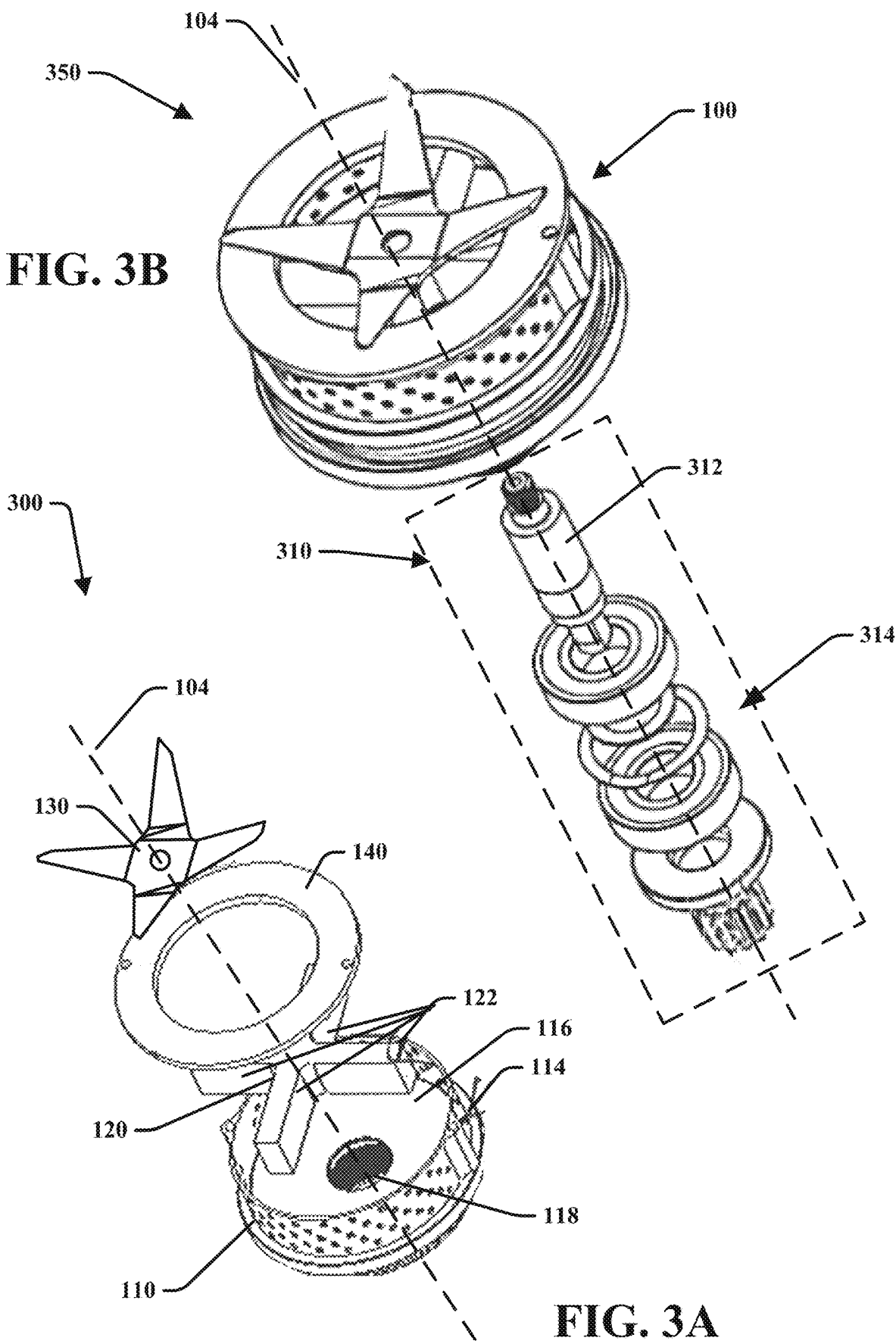

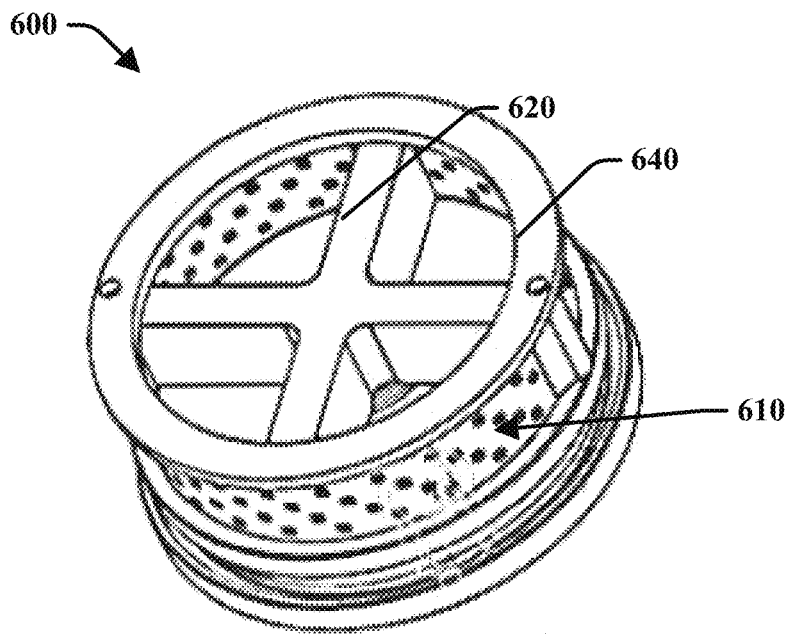
FIG. 6A
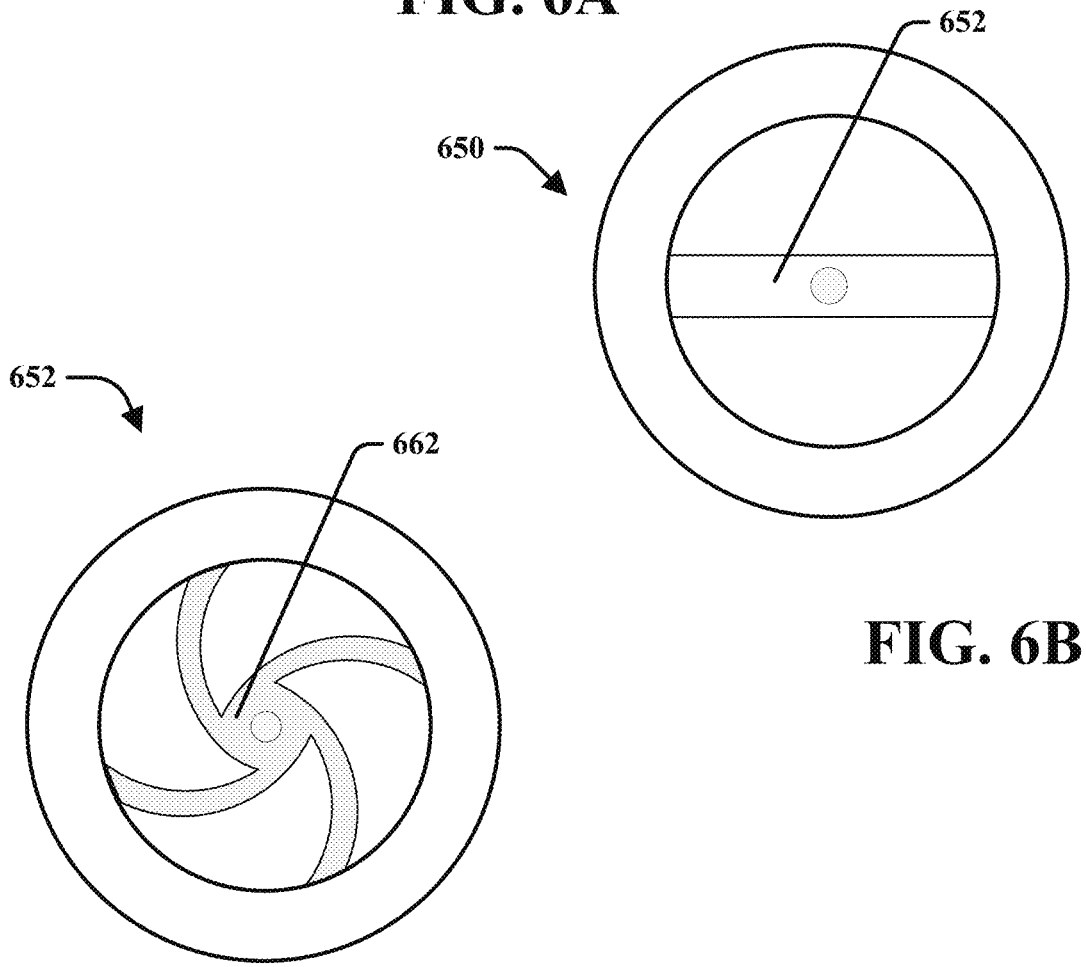
FIG. 6B
FIG. 6C

SHEAR BLADE ASSEMBLY FOR A BLENDER

CROSS REFERENCE TO RELATED APPLICATION

This application claims priority to U.S. Provisional Application Ser. No. 62/026,304 entitled "Blender" and filed on Jul. 18, 2014, the entirety of which is herein incorporated by reference.

FIELD OF THE INVENTION

The present invention is generally related to a blender and, more particularly, to a blender having a shear blending device.

BACKGROUND

Blenders traditionally include a blade assembly attached with a container. The blade assembly of these blenders often requires complex or specific geometries to assist in mixing the contents in the container appropriately. This may limit the size and/or shape that a container may be able to take.

Some closed-rotor rotary mixing heads are mounted to a motor shaft for inducing rotary motion in the head. The head is submerged into a material to be mixed, and through rotary motion, initiates flow and mixing of the material. Opposed internal blades force fluid through slots formed in a cylindrical cage. The size and shape of the slots determines the flow, velocity and shear rates produced by the head.

These mixing heads are typically designed for large batch processing. For example, the mixing heads are attached to a rotary arm. A container or vat is positioned beneath the mixing head and then the head is submerged in fluids within the vat. The large batch processing often requires powerful engines that are generally not suitable for average consumers.

Blenders and blender systems are often used to blend and process foodstuffs. These blenders and blender systems generally use a winged blade to chop or blend the foodstuff. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with a commercial or restaurant-grade blender. Such drinks also may be made at home, using a personal blender.

Therefore, a need exists for improved systems and methods for blending contents in a blender. Further, there is a need for a blender system that generates less noise and decreases the time needed to prepare foodstuff.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present teachings relate to a blender system or more specifically to a shear blending device. The blender system may include a container of any appropriate shape and size. The shear blending device may be disposed within the container. The shear blending device may include a shear blending assembly. The shear blending assembly may include a shear mechanism comprising apertures. A shearing blade may be disposed within the shear mechanism. The shearing blade may force foodstuff through the apertures. The blender system may include a cutting blade. The shear blending assembly may draw foodstuff through a cut path of the cutting blade.

In another aspect, a blender system comprising a pump is disclosed herein. The blender system may include a container and a pump having an inlet and an outlet. The pump may draw foodstuff through the inlet and may exhaust foodstuff through the outlet. The flow path of the foodstuff may be configured to pass through a cut path of a cutting blade.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

FIG. 3A is an expanded view of a portion of the shearing blade assembly, in accordance with various disclosed aspects.

FIG. 3B is an expanded view of a shaft and bearings that may be attached to the shearing blade assembly, in accordance with various disclosed aspects.

FIG. 6A is a perspective view of a shearing blade assembly comprising four shearing wings, in accordance with various disclosed aspects.

FIG. 6B is a top view of a shearing blade assembly comprising two shearing wings, in accordance with various disclosed aspects.

FIG. 6C is a top view of a shearing blade assembly comprising four, curved shearing wings, in accordance with various disclosed aspects.

DETAILED DESCRIPTION

Figure 1:
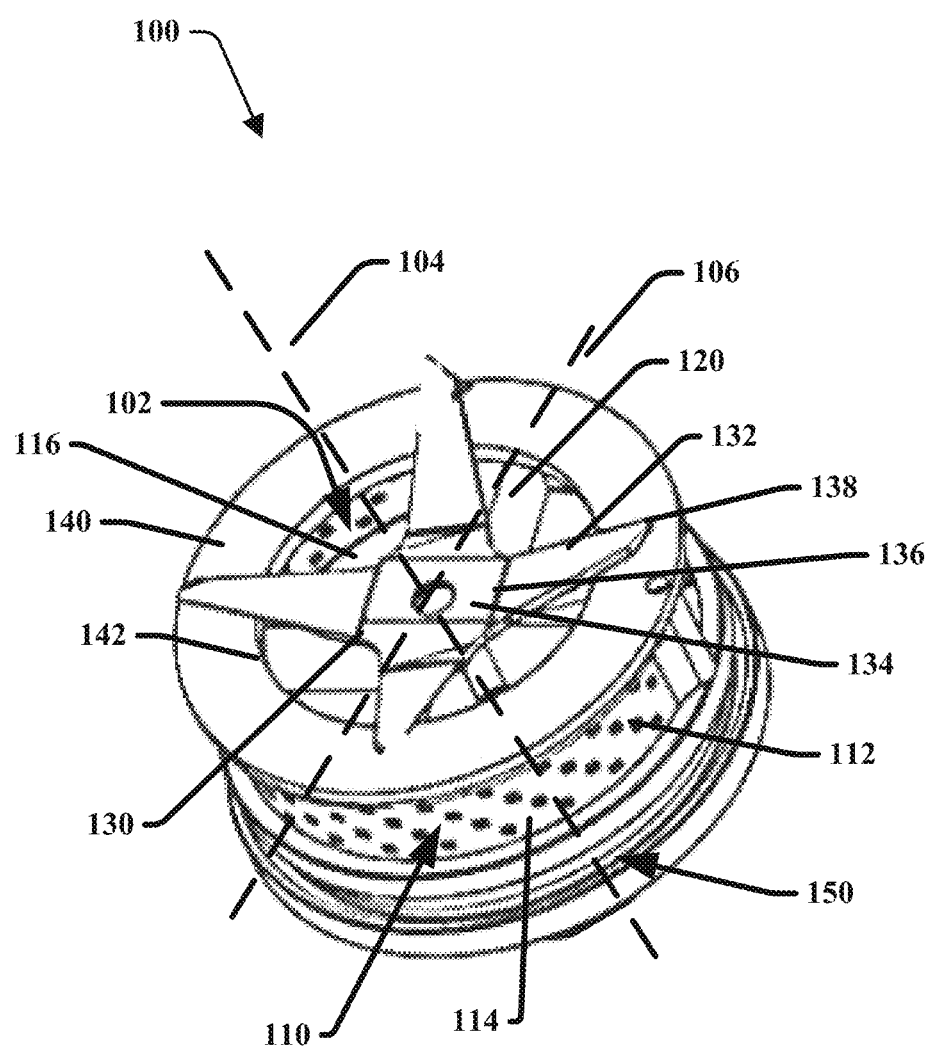
FIG. 1 is a perspective view of at least a portion of a shearing blade assembly, in accordance with various disclosed aspects.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blender systems, various other food preparation systems, and the likes. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes. Further, the blender systems may include any household blender and/or any type of commercial blender system, including those with covers that may encapsulate or partially encapsulate the blender. Further, commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Aspects of systems, apparatuses or processes described herein generally relate to blending or mixing systems. In an embodiment, a shear blending device may mix, blend, chop, shear, or otherwise process foodstuff. The shear blending device may include a container of any appropriate shape and size. The shear blending device may include a shear blending assembly attached with the container. Exemplary embodiments of the shear blending assembly are shown in the attached drawings. The shear blending assembly, however, is not limited to that shown and described herein. It may be of any appropriate configuration.

In operation, the shear blending assembly may act as a pump in the container. As the shear blade rotates in the shear mechanism, the contents in the container may be drawn into and passed the choke plate—such as into the intake area. The contents may then be pushed past and/or through the apertures (which may be any appropriate shape, including, without limitation, circular, oval, square, rectangular, hexagonal, etc.), which may shear the contents. In other words, it may blend the contents.

The shear blending assembly may also include a blade of any appropriate configuration. The blade may take the form of any traditional blender blade. For example, the blade may be bent at compound angles, simple or non-compound angles, or the like. In an aspect, bent blades may increase suction. In at least one embodiment, the blade may comprise wings that are generally flat or coplanar with each other. In an aspect, flat wings may vibrate less than bent wings. Reduced vibration may alter (e.g., reduce) noise produced during operation, increase efficiency, or the like. In an aspect, the shear blending assembly may alter (e.g., decrease) the amount of time needed to blend foodstuff in comparison with other blender systems.

Turning now to the figures, FIG. 1 is a pump or shearing blade assembly 100 that may be suitable for use in a blender system. For example, shearing blade assembly 100 may be attached to or incorporated with a blender container. Foodstuff may be placed within the blender container, and the shearing blade assembly 100 may be rotated or driven by a motor. Rotation of the shearing blade assembly 100 may blend the foodstuff to a desired consistency.

Shearing blade assembly 100 may primarily comprise a shearing mechanism 110, a shearing blade 120, a cutting blade 130, a choke plate 140, and a nut 150 (which may be configured for attaching the shearing blade assembly 100 to a blending container). While referred to as separate components, it is noted that various components of shearing blade assembly 100 may comprise a single component. In another aspect, the various components may comprise monolithic constructions or may be attachable (e.g., removably or irremovably) to each other. For example, shearing blade 120 and cutting blade 130 may be monolithically formed, such as through molding, etching, three-dimensional printing, or other processes. In another example, the shearing blade 120 and the cutting blade 130 may be separately formed and may be attachable to a rotary axle. It is noted that the components may comprise various materials, such as plastics, metals, or the like. For instance, shearing blade 120 and the cutting blade 130 may comprise a metal, such as stainless steel, or the like.

In embodiments, shearing mechanism 110 may comprise a closed end 116 and side wall 114. Side wall 114 may comprise one or more apertures 112 formed or bored therethrough. The apertures 112 may comprise various shapes, sizes, patterns, or the like. The shapes may represent circles, ellipses, rectangles, n-sided polygons (where n is a number), non-regular shapes, or the like. While depicted as comprising generally similar shapes, it is noted that the shearing mechanism 110 may comprise apertures 112 or different shapes. For instance, apertures 112 may comprise a number of square apertures and a number of circular apertures.

The apertures 112 may be orthogonally formed through the shearing mechanism 110. According to at least one embodiment, the apertures 112 may be formed at different angles with respect to the shearing mechanism 110. It is noted that the inner perimeters of the apertures 112 may be conical in shape, a common size throughout, or the like. It is further noted that the apertures 112 may be disposed in a regular or semi-regular repeating pattern, may be randomly placed, or otherwise disposed about side wall 114 of the shearing mechanism 110. In embodiments, portions of the shearing mechanism 110 may comprise apertures while other portions do not comprise apertures. It is noted that edges of the apertures 112 may be sharp, squared, and/or rounded.

In an aspect, the properties of the at least one aperture 112 (e.g., shapes, sizes, angle, placement, etc.) may be selected for a desired flow rate, flow pattern (e.g., direction at which foodstuff is dispersed from aperture 112), and/or shearing rate. In another aspect, the properties may be selected based on a desired consistency or viscosity of a blended product. Moreover, shearing mechanism 110 may comprise any combination of apertures 112 having various properties.

Shearing blade 120 may be disposed within an intake area 102 of the shearing mechanism 110. Shearing blade 120 may comprise a number of wings that may protrude from proximal to axis 104 towards side wall 114. While shearing blade 120 is depicted as comprising four wings, it is noted that the shearing blade 120 may comprise a different number of wings. In another aspect, the wings may be generally perpendicular with each other. The wings may be generally rectangular prism-like in shape and/or may comprise other shapes. For instance, the wings may comprise fan blade shapes, concave/convex shapes, or the like. The wings may be generally perpendicular with a horizontal, such as axis 106. It is noted, however, that the wings may be at angles with respect to the horizontal.

In at least one embodiment, as described in FIG. 3A, wings 122 of the shearing blade 120 are designed to push or otherwise force foodstuff from inlet area 102. The wings 122 force the foodstuff through the apertures 112 of the shearing mechanism 110. As foodstuff is forced through the apertures 112, it may contact edges of the apertures 112 and may be sheared or blended. In another aspect, as the foodstuff is forced through the apertures 112, more foodstuff may be drawn into the inlet area 102. To this and various other ends, the shearing blade assembly 100 may act as a pump that draws in of the foodstuff to the inlet area 102.

Cutting blade 130 may be disposed above shearing blade 120 and/or intake area 102. Cutting blade 130 may comprise one or more wings 132 extending at a proximal end 136 from a central body member 134 to a distal end 138. The wings may be configured to chop or blend foodstuff during operation. In an aspect, the wings 132 may be oriented at compound angles with respect to the body member 134 to provide the cutting blade 130 with a compound angle of attack through a cutting path. Flow generated by the wings due to rotation of the cutting blade 130 may draw foodstuff through the cutting path to mix the foodstuff and grind any solids entrained therein.

Embodiments described herein may comprise various configurations of cutting blade 130. For instance, cutting blade 130 may comprise bends including non-compound angles or compound angles. In another aspect, the wings of cutting blade 130 may be generally flat, coplanar with each other, and/or parallel with axis 106. For instance, shearing mechanism 110 and shearing blade 120 may be configured to draw in foodstuff in a pump-like fashion. Drawing in of the foodstuff may force the foodstuff through a cutting path of the cutting blade 130. It is noted that the cutting blade 130 may not need to generate a large amount of lift or may not need to generate any lift. As such, the reduced need to generate lift may allow the cutting blade 130 to be generally flat. Flattening of the cutting blade 130 may reduce vibrations in the cutting blade 130 and/or in a blender system overall. The reduced vibration may decrease the noise generated by the blender system and may increase overall user satisfaction.

Choke plate 140 may comprise a flange or ledge disposed at an open end of side wall 114. The choke plate 140 may be monolithically formed with the side wall 114 and/or may be attached to the side wall 114. An inner perimeter 142 of the choke plate 140 may contribute to control of a flow rate or suction of shearing blade assembly 100. For instance, as the inner perimeter 142 decreases in size, the flow rate of foodstuff (e.g., amount of foodstuff that may flow to inlet area 102 over an amount of time) may decrease. An increase of the size of inner perimeter 142 may increase the flow rate of foodstuff. It is noted that the suction of shearing blade assembly 100 may also be altered based on the size and/or shape of inner perimeter 142.

Figure 2:
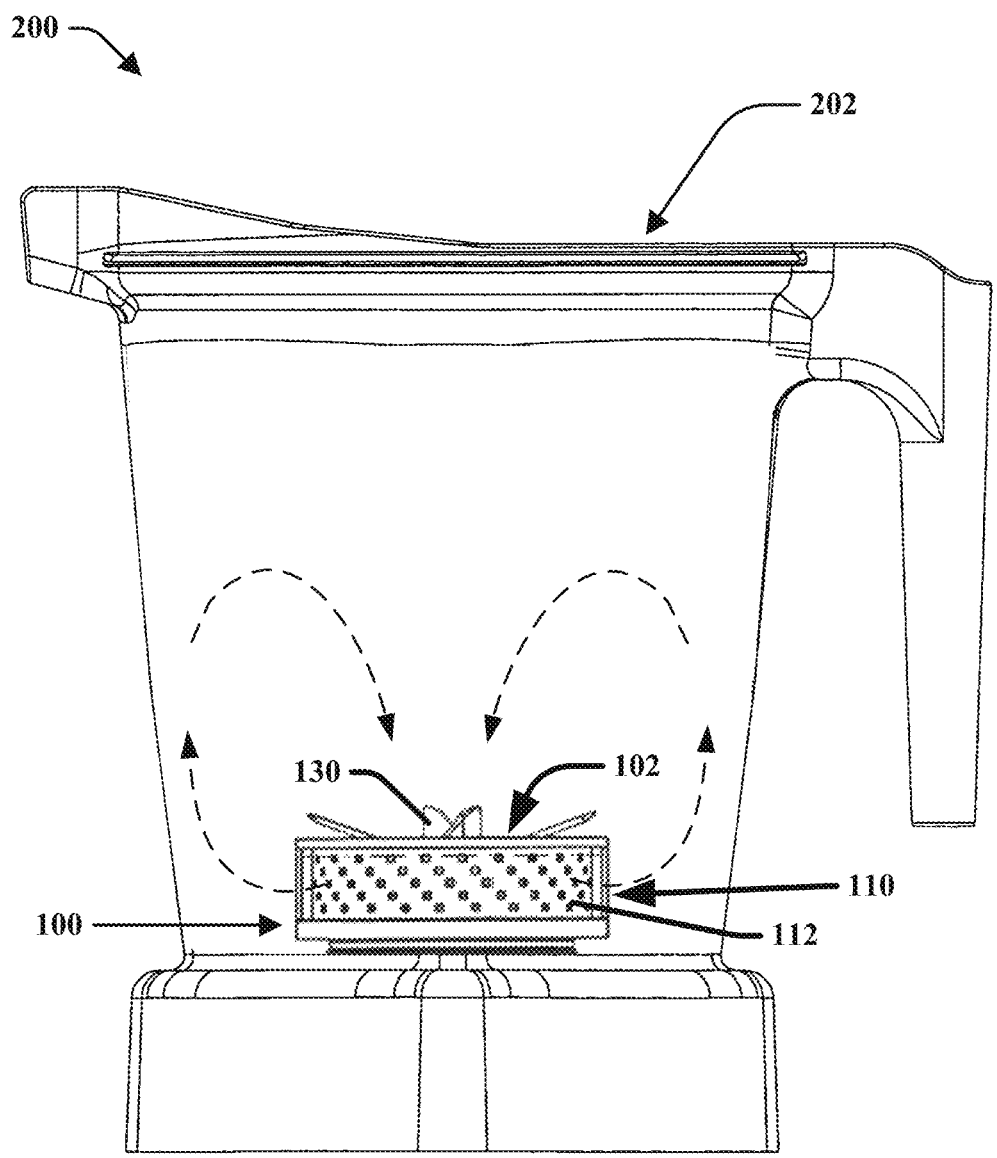
FIG. 2 is a front view of at least a portion of a blender system comprising the shearing blade assembly and a blender container, in accordance with various disclosed aspects.

FIG. 2 depicts a blender system 200 that may primarily comprise a blender container 202 and the shearing blade assembly 100. The container 202 and shearing blade assembly 100 may be attachable (e.g., removably or irremovably). It is noted that blender system 200 may include a blender base that may comprise a motor. The motor may drive the shearing blade assembly 100 for mixing foodstuff. For example, a user may place foodstuff in the container 202. Power may be supplied to the motor and the motor may drive the shearing blade assembly 100 to rotate at least a portion of the shearing blade assembly 100.

In an embodiment, the motor may drive the shearing blade 120 and the cutting blade 130. The shearing mechanism 110 and choke plate 140 may remain stationary with respect to the container 202. As the shearing blade 120 rotates, foodstuff may be forced through apertures 112. Apertures 112 may shear the foodstuff and serve as an exhaust that may allow foodstuff to flow from the inlet area 102. The dotted lines of FIG. 2 may depict the flow of foodstuff as it is forced out of apertures 112 and then sucked or pumped in the inlet area 102. In an aspect, the shearing mechanism 110 may act as a pump that may force foodstuff through the cutting path of cutting blade 120. According to at least one embodiment, apertures 112 may be configured to function as exhaust ports that may not shear foodstuff. In an example, the apertures 112 may comprise relatively large apertures that allow foodstuff to pass through them without substantially shearing the foodstuff. As such, the shearing blade assembly 100 may act as a pump.

It is noted that the shearing blade assembly 100 may be configured to pump foodstuff while a disparate cutting blade assembly may be configured to cut, chop, or otherwise process foodstuff. For instance, a pump may comprise wings that may create lift when they rotate about an axis. The lift may draw in foodstuff and move the foodstuff to another area. In an aspect, the pump may be positioned to generate a flow of foodstuff that passes through a cut path of the cutting blade assembly. This may allow the cutting blade to be generally flat, having reduced vibrations. According to one example, the pump may draw foodstuff through a handle of the blender container, through a first container to a second container, or the like.

While FIG. 2 depicts the shearing blade assembly 100 generally parallel with a horizontal when connected with or attached to the blender container 202, it is noted that the shearing blade assembly 100 may be disposed at an angle with reference to the horizontal. In at least one embodiment, the shearing blade assembly 100 may be offset or not centered in the blender container 202. For example, the shearing blade assembly may be at an angle from the horizontal and may be disposed at or near a corner of the blender container 202.

Turning to FIGS. 3A and 3B with reference to FIGS. 1 and 2, there are expanded views 300 and 350 of shearing blade assembly 100 in accordance with various disclosed aspects. As shown in FIG. 3A, cutting blade 130, shearing blade 120, choke plate 140 and shearing mechanism 110 may be assembled from one or more monolithically formed components. In at least one embodiment, shearing blade 120 may be disposed within an inlet area 102 of shearing mechanism 110. Shearing blade 120 may comprise a plurality of shearing walls or wings 122. The shearing wings 122 may be monolithically formed or may be attached, such as at or near axis 104. The shearing wings 122 may protrude from proximal the axis 104 towards the side walls 114 of the shearing mechanism 110. It is noted that the shearing wings 122 may touch the interior of side walls 114 or may be within a threshold distance. In at least one example, the shearing wings 122 may be between about 0.05 millimeters (mm) and 1 mm from the interior of side walls 114. In another aspect, the shearing wings 122 may be generally rectangular prism-shaped. In an example, the shearing wings 122 may be normal or orthogonal with respect to a closed end 116 of the shearing mechanism 110.

While depicted as comprising four rectangular prism-shaped shearing wings 122 configured in a plus-shape, it is noted that shearing blade 120 may comprise wings having various other configurations. As described here as well as elsewhere in this disclosure, the shearing blade 120 may comprise a different number of wings (e.g., 1, 2, 3, etc.), differently shaped wings (e.g., cylindrical in shape, obliquely angled with respect to closed end 116, etc.), or the like. For instance, the shearing blade 120 may comprise fan blade-shaped wings. In another aspect, the shearing wings 122 may be bent or formed with compound angles, non-compound angles, or the like.

The shearing mechanism 110 may comprise side wall 114 that is generally perpendicular with the closed end 116. The side wall 114 may generally represent a circular or cylindrical shape. It is noted that the side wall 114 may represent other shapes such as regular and/or irregular prism shapes. It is also noted that the side wall 114 may be other than perpendicular with the closed end 116, for instance, the side wall 114 may generally represent a perimeter of a cross-section of a cone or the like. In another aspect, the side wall 114 may be monolithically formed or may comprise a plurality of portions that are attached to form side wall 114. The side wall 114 may be attached with closed end 116. Closed end 116 may comprise an aperture 118 configured to receive a drive shaft that drives at least one of cutting blade 130, shearing blade 120, and/or side wall 114. While examples refer to a side wall, it is noted that shearing mechanism 110 may comprise any number of side walls.

Choke plate 140 may be disposed above the shearing mechanism 110 to control flow of foodstuff in an inlet area 102. It is noted that choke plate 140 may comprise various shapes based on a desired implementation, flow rate, suction, or the like. As described herein, choke plate 140 may be monolithically formed with one or more other components. In at least one example, the choke plate 140 may comprise a ledge or flange of the side wall 114.

Expanded view 350 shows shearing blade assembly 100 and an attachment assembly 310. The attachment assembly 310 may comprise a shaft 312 and one or more bearings 314. In an aspect, the shaft 312 may extend through apertures of at least one of shearing mechanism 110, shearing blade 120, choke plate 140 and/or cutting blade 130. For instance, shearing mechanism 110, shearing blade 120, choke plate 140 and cutting blade 130 may be coaxially aligned to receive shaft 312. In another aspect, shearing blade assembly 100 may be removably or irremovably secured to shaft 312. Rotation of shaft 312 may cause rotation of at least a portion of shearing blade assembly 100.

In embodiments, shearing blade assembly 100 may be configured such that shaft 312 rotates at least one of shearing blade 120 and/or shearing mechanism 110. For example, shaft 312 may rotate shearing blade 120 about axis 104 while shearing mechanism 110 remains stationary. In another example, shearing mechanism 110 and shearing blade 120 may rotate at different speeds. In yet another example, shearing mechanism 110 may rotate while shearing blade 120 remains stationary.

It is noted that shearing blade 120 may comprise or may be attached to closed end 116. For instance, closed end 116 may be detached from side wall 114. Side wall 114 may be configured to connect to shaft 312 and/or a blender container (e.g., blender container 202). Shaft 312 may be configured to couple with shearing blade 120 and closed end 116. Rotation of shaft 312 may cause the shearing blade 120 to rotate about axis 104 with respect to side wall 114.

Cutting blade 130 may be coupled to shaft 312 such that shaft 312 drives the cutting blade 130. It is noted that cutting blade 130 and other components, such as shearing blade 120, may be coupled to the shaft 312 and may rotate at a common speed or rate. In another aspect, the cutting blade 130 may be coupled to shaft 312 such that it rotates at a different rate than shearing blade 120. In an example, attachment assembly 310 may comprise two shafts where a first shaft is connected to cutting blade 130, and a second shaft is connected to shearing blade 120. The first and second shaft may rotate at different rates or speeds such that the cutting blade 130 and shearing blade 120 rotate at different rates. In another example, the torque of the first shaft and the second shaft may be similar or different from each other. In this aspect, the cutting blade 130 and the shearing blade 120 may rotate independent of each other (e.g., at different speeds, rates, powers, etc.). Independent rotation may allow for different blending patterns or properties.

Figure 4A:
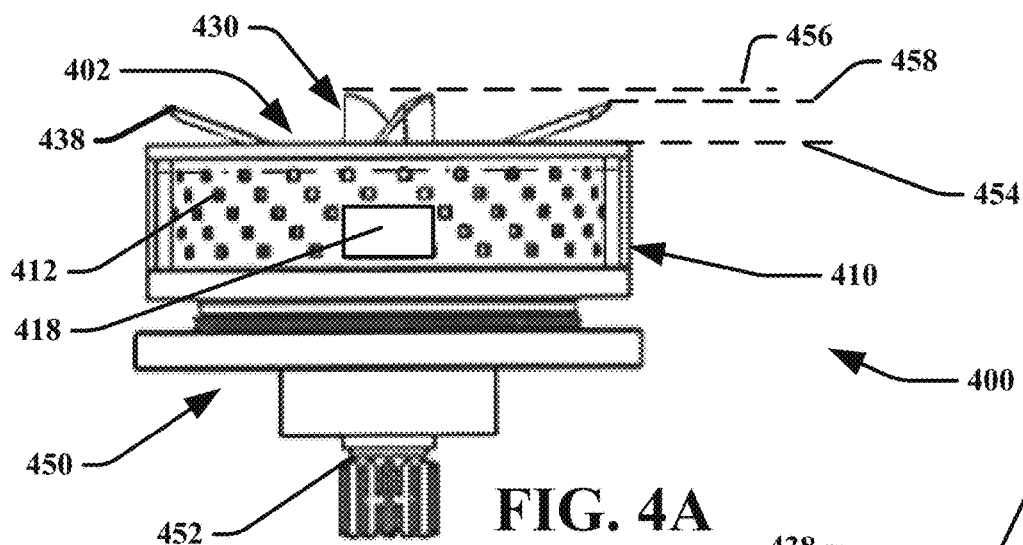
FIG. 4A is a side view of a shearing blade assembly including a retainer nut, in accordance with various disclosed aspects.
Figure 4B:
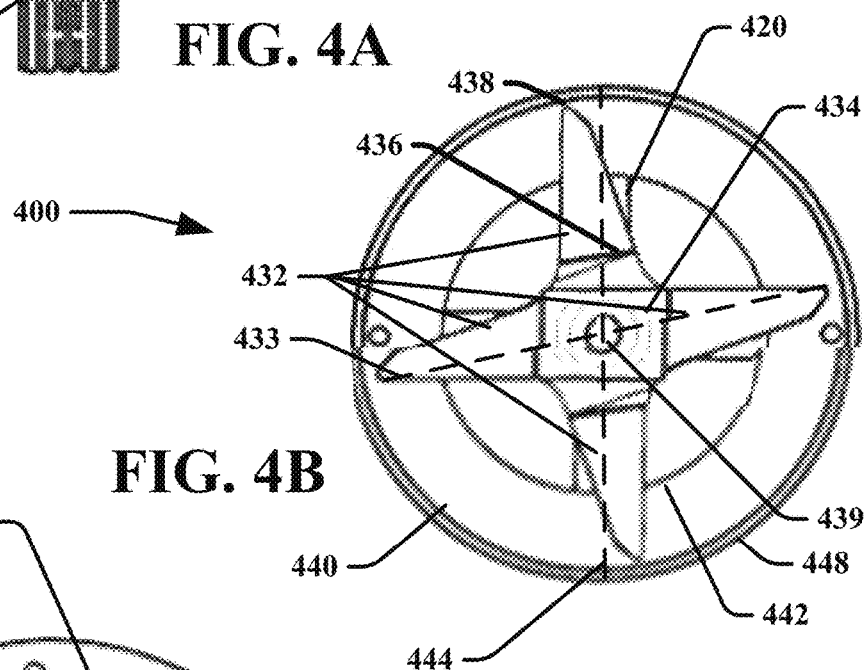
FIG. 4B is a top view of a shearing blade assembly, in accordance with various disclosed aspects.
Figure 4C:
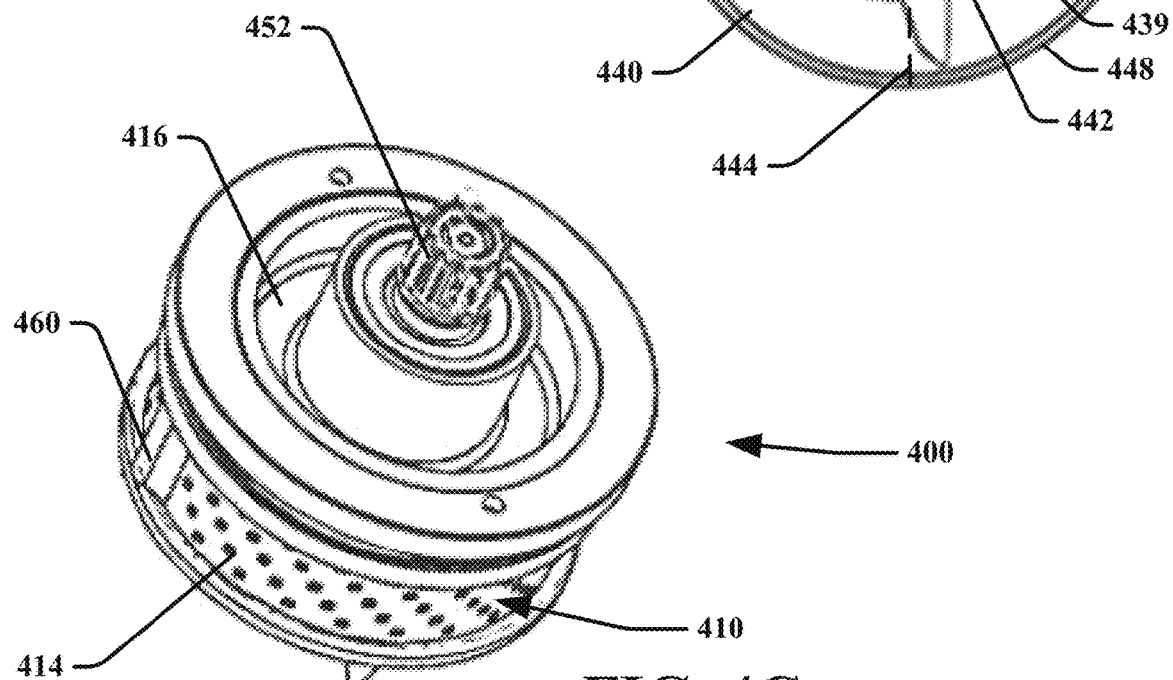
FIG. 4C is a bottom perspective view of a shearing blade assembly, in accordance with various disclosed aspects.

Turning now to FIGS. 4A, 4B, and 4C, depicted are various views of a shearing blade assembly 400 in accordance with one or more described embodiments. It is noted that shearing blade assembly 400 may comprise various aspects and/or components described with reference to shearing blade assembly 100.

Shearing blade assembly 400 may primarily comprise a shearing mechanism 410, shearing blade 420 and a cutting blade assembly 430. In another aspect, shearing blade assembly 400 may comprise a choke plate 440 (which may control flow of foodstuff). As an example, shearing blade assembly 400 may be attached to a blender container, such as via attachment nut 450. A portion of a shaft 452 may extend towards a motor when the shearing blade assembly 400 is coupled with the blender container. Rotation of the shaft 452 may drive various components of the shearing blade assembly 400 as described herein.

In an embodiment, cutting blade assembly 430 may comprise similar aspects as those of cutting blade 130. For instance, the cutting blade assembly 430 may comprise wings 432 that may be bent at compound angles, simple angles, or the like. Each wing 432 may extend from a proximal end 436 to a distal end 438. The wings 432 may generally converge near a body or body portion 434. The body portion 434 may comprise an aperture 439 formed therethrough. The aperture 439 may be configured to receive the shaft 452.

A wingspan 433 of a pair of the wings 432 may be less than or equal to a length or diameter 444 of choke plate 440. It is noted, however, that the wingspan 433 may be greater in length than the diameter 444. In another aspect, a blade assembly may not comprise a pair of wings that have a wingspan (e.g., where distal ends of wings are not disposed opposite each other) and/or may not have a circular choke plate 440. As such the relationship between the wings 432 and choke plate 440 may be defined in terms other than wingspan and/or diameter. For instance, a distal end 438 of one or more wings 432 may extend past or to an outer perimeter 448 of choke plate 440, may extend between outer perimeter 448 and inner perimeter 442, or may extend to or may not reach the inner perimeter 442.

Wings 432 of cutting blade 430 may be at least partially disposed above or below a surface level 454 of the choke plate 440. For instance, body portion 434 may be disposed below the surface level 454 while portions of the wings 432, such as distal end 438, may extend to a first level 456 and/or a second level 458. In at least one embodiment, the first level 456 and second level 458 may be disparate or substantially similar. In another aspect, a first wing may extend at or below surface level 454 while a second wing may extend above surface level 454. It is noted that various configurations may be utilized. For instance, one or more wings of cutting blade 430 may extend within inlet area 402, such as between wings of shearing blade 120. While the wings 432 have been described as extending above and/or below the surface level 454, it is noted that "above" and "below" are used for purposes of referring to the drawings. As such, the relative positions may be described by other terms. The terms used herein are utilized for exemplary purposes and sake of clarity with reference to the drawings.

As shown in FIG. 4B, wings 432 of cutting blade 430 may be generally aligned with wings of shearing blade 420 (e.g., wings 122 of FIG. 3A). For instance, wings 432 and wings of the shearing blade 420 may be generally stacked and/or arranged about a common axis. In an aspect, the positions of the cutting blade 430 and the shearing blade 420 may be generally fixed with respect to each other. For example, the cutting blade 430 and the shearing blade 420 may be attached to shaft 452 such that the cutting blade 430 and the shearing blade 420 rotate at a same rate or speed, resulting in the relative positions of each of the blades to remain generally similar. In at least one embodiment, the cutting blade 430 and the shearing blade 420 may be attached (e.g., removably or irremovably) to each other. It is noted that cutting blade 430 and the shearing blade 420 may not be aligned and/or may rotatably move with respect to each other.

Shearing mechanism 410 may comprise a side wall 414 and a bottom surface 416. The side wall 414 and closed end 416 may define the inlet area 402. The side wall 414 may comprise one or more apertures 412. The apertures 412 may be of various shapes and sizes. For instance, aperture 418 may be larger in area than at least one other of the apertures 412.

In another aspect, shearing mechanism 410 may comprise a coupling component 460 that may couple or hold side wall 414 in place. In an example, the coupling component 460 may comprise a chamber that may receive a threaded member (e.g., screw, bolt, etc.) for securing at least one of the side wall 414 or choke plate 440 with an attachment nut 450.

Figure 5A:
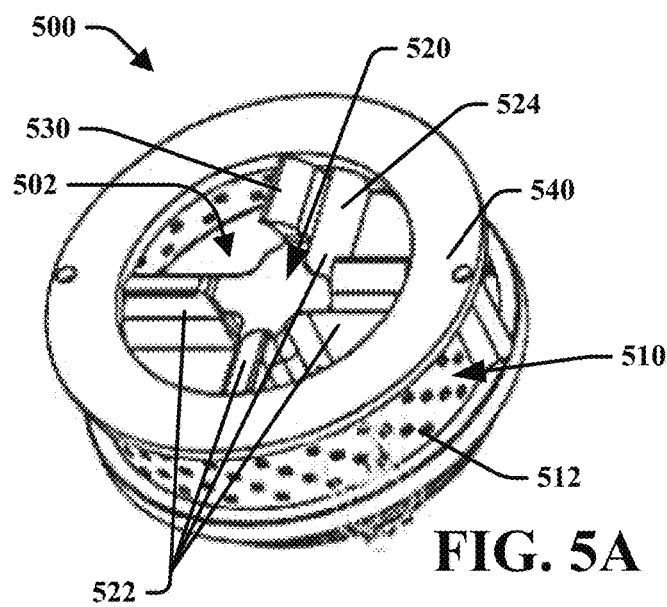
FIG. 5A is a perspective view of a shearing blade assembly including a shearing blade comprising cutting blades, in accordance with various disclosed aspects.
Figure 5B:
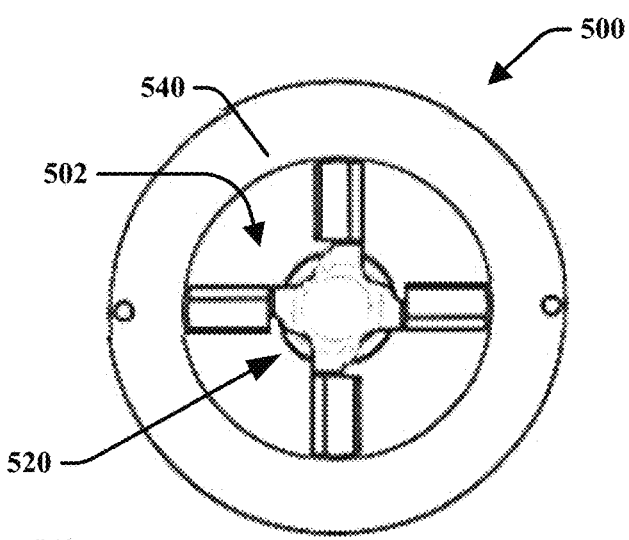
FIG. 5B is a top view of a shearing blade assembly including a shearing blade comprising cutting blades.
Figure 5C:
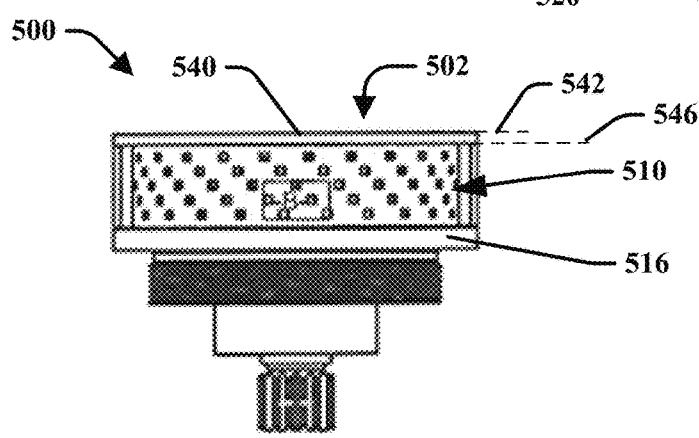
FIG. 5C is a side view of a shearing blade assembly including a shearing blade comprising cutting blades.

With reference now to FIGS. 5A, 5B, and 5C, illustrated is shearing blade assembly 500 in accordance with various described embodiments. Shearing blade assembly 500 may comprise cutting blades integrated with shearing blades. The integrated blades may allow for cutting/chopping and shearing. It is noted that the shearing blade assembly 500 may comprise similar aspects to those described with reference to other embodiments. For instance, shearing blade assembly 500 may comprise a shearing mechanism 510 and a choke plate 540. The shearing mechanism 510 may comprise similar aspects as shearing mechanism 110, 410, etc. In another aspect, the choke plate 540 may comprise similar aspects as choke plate 140, 440, etc. It is further noted that, while components of shearing blade assembly 500 may be described or depicted as separate components, the various components may comprise one or more components. For instance, shearing mechanism 510 and choke plate 540 may be monolithically formed and/or may comprise disparately formed components that are attached (e.g., removably or irremovably).

According to at least one embodiment, the shearing blade assembly 500 may comprise blade 520. Blade 520 may comprise wings 522 that may include a pump portion 524 and a cutting portion 530. The pump portion 524 (e.g., shearing blade) may be configured to move foodstuff in inlet area 502. In an aspect, the pump portion 524 may force the foodstuff through apertures 512 of the shearing mechanism 510. Cutting portion 530 (e.g., cutting blade) may be integrally formed with the pump portion 524 and/or attached (e.g., removably or irremovably) with the pump portion 524. For example, the cutting portion 530 and pump portion 524 may be molded, printed, etched, or the like from or with a common material. In another example, the cutting portion 530 may be formed then attached (e.g., mechanically, chemically, magnetically, etc.) to pump portion 524. In at least one embodiment, the cutting portion 530 may be a sharpened and/or beveled edge of pump portion 524.

The blade 520 may be housed within the shearing mechanism 510. In an example, the blade 520 may be disposed between a bottom surface or closed end 516 and the choke plate 540. In an embodiment, the cutting portion 530 may extend above, about equal to, or below an upper surface 542 of the choke plate 540, above, about equal to, or below a lower surface 546 of the choke plate 540, between the upper surface 542 and the lower surface 546, or the like. It is noted that the cutting portion 530 may be disposed on different portions of pump portion 524. It is also noted that the blade 520 may comprise a different number of cutting portions and/or pump portions. For instance, a first wing may comprise a pump portion and cutting portion, while a second wing may comprise a pump portion without a cutting portion.

FIGS. 6A, 6B, and 6C are various shearing blade assemblies that may not comprise a cutting blade. FIG. 6A is a shearing blade assembly 600. The shearing blade assembly 600 may comprise components and/or aspects similar to those of various other described embodiments. In an example, the shearing blade assembly 600 may primarily comprise shearing mechanism 610, shearing blade 620, and choke plate 640. In an aspect, the shearing blade 620 may comprise a general cross-like or plus-like formation comprising a number of wings or walls. While the shearing blade 620 is depicted as comprising four generally rectangular prism wings, it is noted that shearing blade 620 may comprise a different number of wings and/or different arrangements thereof. For instance, FIG. 6B is a top view of a shearing blade assembly 650 comprising a shearing blade 652. The shearing blade 652 may comprise two wings that are arranged in a straight line. FIG. 6C is a top view of shearing blade assembly 660 comprising a shearing blade 662. The shearing blade 662 may comprise four curved wings arranged in a fan-like configuration.

In an aspect, shearing blade assemblies 600, 650, and/or 660 may be utilized with or without a cutting blade assembly. For instance, shearing blade assembly 600 may be attached to a blender container for shearing foodstuff without a cutting blade. In another example, the shearing blade assembly 600 may be utilized in a blender container with a separate cutting blade assembly.

Figure 7:
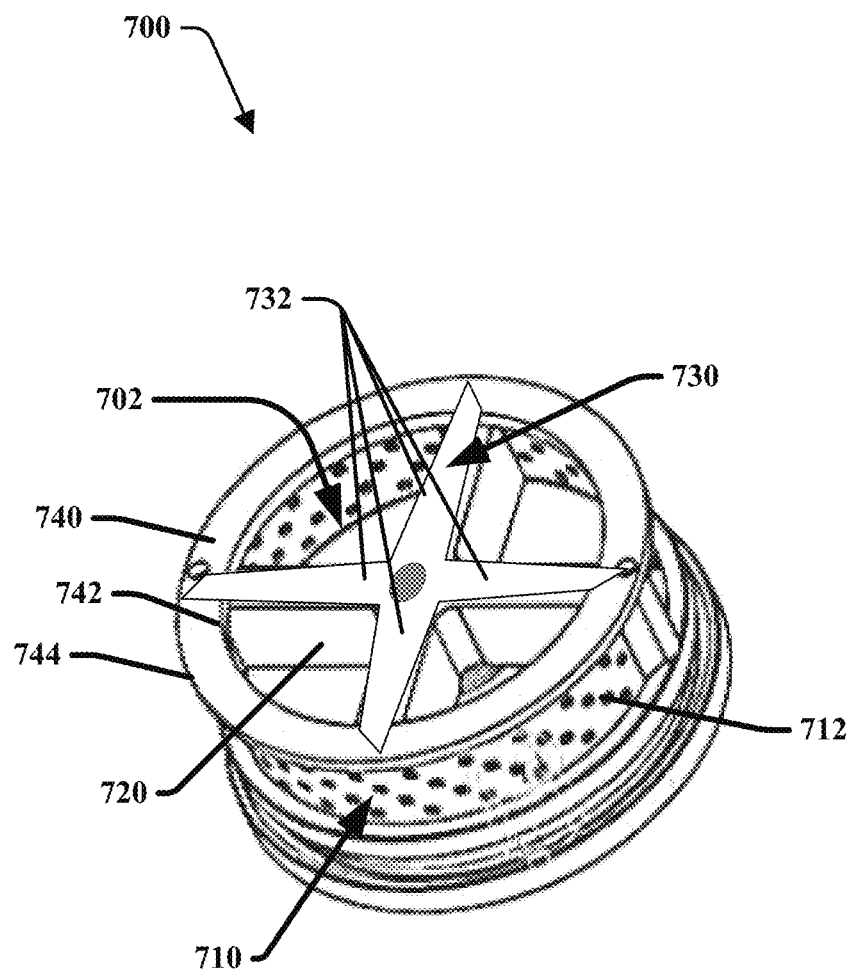
FIG. 7 is a perspective view of at least a portion of a shearing blade assembly including a generally flat cutting blade, in accordance with various disclosed aspects.

Turning to FIG. 7, illustrated is a shearing blade assembly 700 comprising a straight or flat cutting blade. For instance, cutting blade 730 may comprise one or more wings 732 that are generally flat and/or coplanar with each other. In an aspect, the pumping action of shearing blade 720, shearing mechanism 710, and/or choke plate 740 may draw foodstuff into inlet area 702 and may force foodstuff through an exhaust or apertures 712. As foodstuff is pumped through the inlet area 702, the foodstuff may pass through a cut path of the cutting blade 730. The cutting blade 730 may cut, chop, or otherwise blend the foodstuff as it rotates.

In an aspect, the cutting blade 730 may not need to draw foodstuff through its cutting path. For instance, some cutting blades are designed to create lift when they are rotated. This is typically accomplished through compound bends in wings and/or by angling wings. The lift draws foodstuff through a cutting path but also makes the wings more susceptible to bending or vibrating. In another aspect, the lift may cause the blade or other component (e.g., drive shaft) to wobble. The wobbling, bending, and vibrating may result in inefficiencies with respect to a flat blade. For instance, a bent blade may produce a large amount of noise due to vibration, and a wobbling blade (or other component) may damage a motor, induce heat, or otherwise may degrade the integrity of a system. According to the present disclosure, shearing blade apparatus 700 may act as a pump that draws the foodstuff through the cutting path of the blade 730. This may allow the wings 732 to be generally flat and/or at reduced angles with respect to other blades, as the wings 732 may not need to create lift during blending. The flatness and/or limited bending of the wings 732 may reduce vibrations, noise, and/or wobble in the shearing blade assembly 700 and/or in a blender system.

One or more of wings 732 may extend to between an inner perimeter 742 of the choke plate 740 and an outer perimeter 744 of the choke plate 740. In another aspect, at least one of wings 732 may extend to or past the outer perimeter 744 and/or to or a position before inner perimeter 742. In an aspect, a thickness of the cutting blade 730 may depend on the length of the wings 732 and/or a maximum speed of rotation. In an example, a wing thickness may be proportional to a wing length, such that longer wings are generally thicker than shorter wings. This thickness to length ratio may allow increase stability of wings 732 which may reduce vibrations or the like.

FIGS. 8A, 8B, 8C, and 8D are various shearing blade assemblies which may comprise shearing mechanisms having differently configured apertures. It is noted that the various depicted shearing blade assemblies describe exemplary embodiments that demonstrate the availability of different types or configurations of apertures. The exact configuration may be selected as a combination of these and/or other described apertures. In another aspect, the apertures may be formed or drilled based on a desired flow rate, thickness of a blended product, or the like. As such, the shape, size, location, number of, or other parameters associated with the apertures may be selected based on a desired application.

Figure 8A:
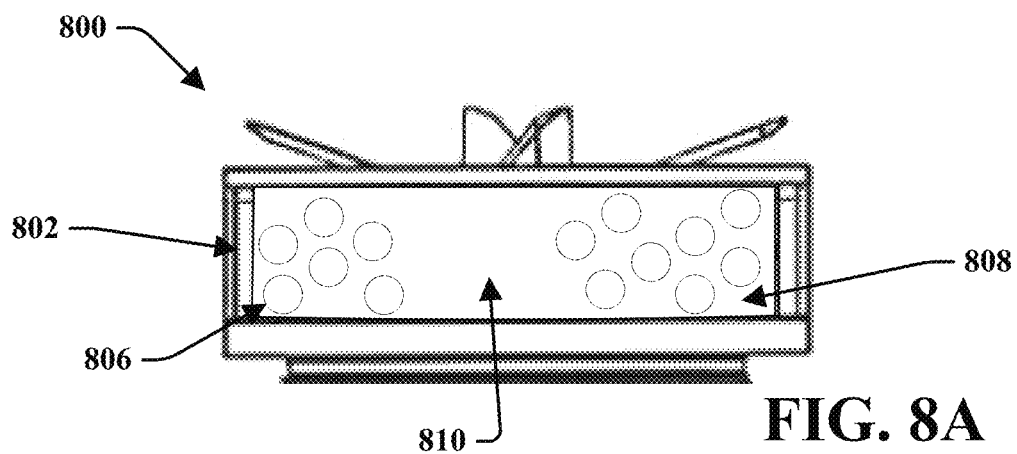
FIG. 8A is a side view of a shearing blade assembly comprising circular apertures, in accordance with various disclosed aspects.

FIG. 8A depicts shearing blade assembly 800 that may comprise a shearing mechanism 802. Shearing mechanism 802 may comprise a first set of apertures 806 and a second set of apertures 808. In an aspect, the first set of apertures 806 and the second set of apertures 808 may comprise a plurality of circular or cylindrical apertures. The apertures may be orthogonally drilled or formed through the shearing mechanism 802. In at least one embodiment, the shearing mechanism 802 may comprise an area devoid of apertures, such as flat area 810.

Figure 8B:
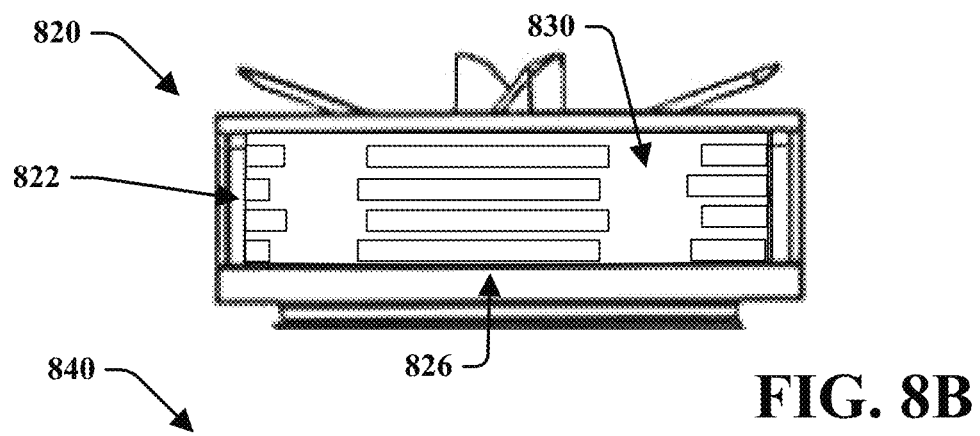
FIG. 8B is a side view of a shearing blade assembly comprising rectangular apertures, in accordance with various disclosed aspects.

FIG. 8B depicts shearing blade assembly 820 that may comprise a shearing mechanism 822. Shearing mechanism 822 may include one or more set of orthogonally formed, rectangular apertures 826. In another aspect, the shearing mechanism 820 may include a flat area 830.

Figure 8C:
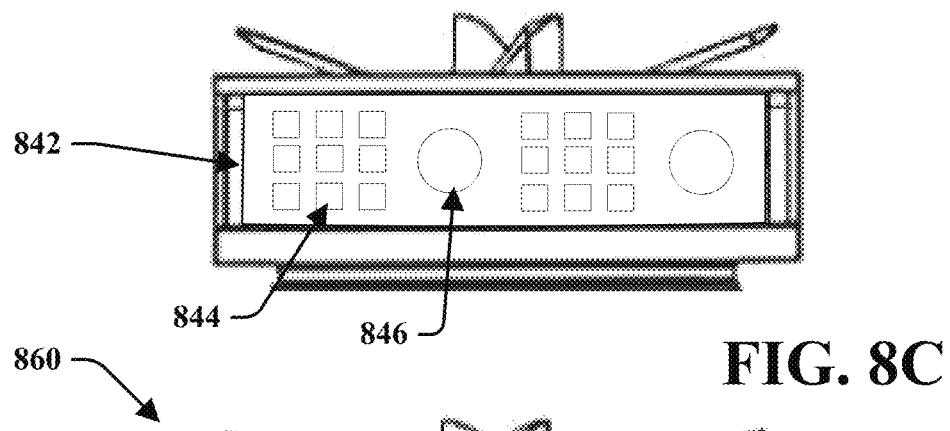
FIG. 8C is a side view of a shearing blade assembly comprising differently shaped apertures, in accordance with various disclosed aspects.

FIG. 8C depicts shearing blade assembly 840 that may comprise a shearing mechanism 842 that may include variously shaped apertures. For instance, a first set of rectangular apertures 844 may be disposed or formed through shearing mechanism 842. In another aspect, round aperture 846 may also be formed therethrough.

Figure 8D:
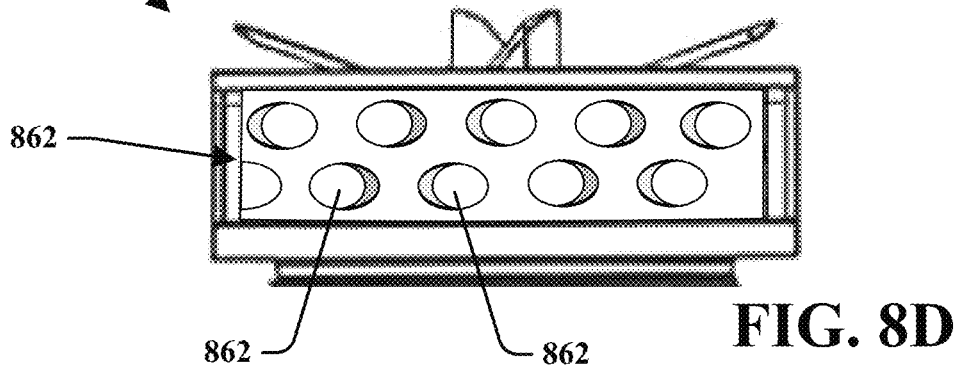
FIG. 8D is a side view of a shearing blade assembly comprising apertures formed at angles other than orthogonally with the side wall, in accordance with various disclosed aspects.

FIG. 8D depicts shearing blade assembly 860 that may comprise a shearing mechanism 862 comprising angled apertures. In at least one embodiment, shearing mechanism 862 may comprise angled aperture 864 and/or angled aperture 866. It is noted that the angled aperture 864 and angled aperture 866 may be formed at or drilled at different angles.

Figure 9:
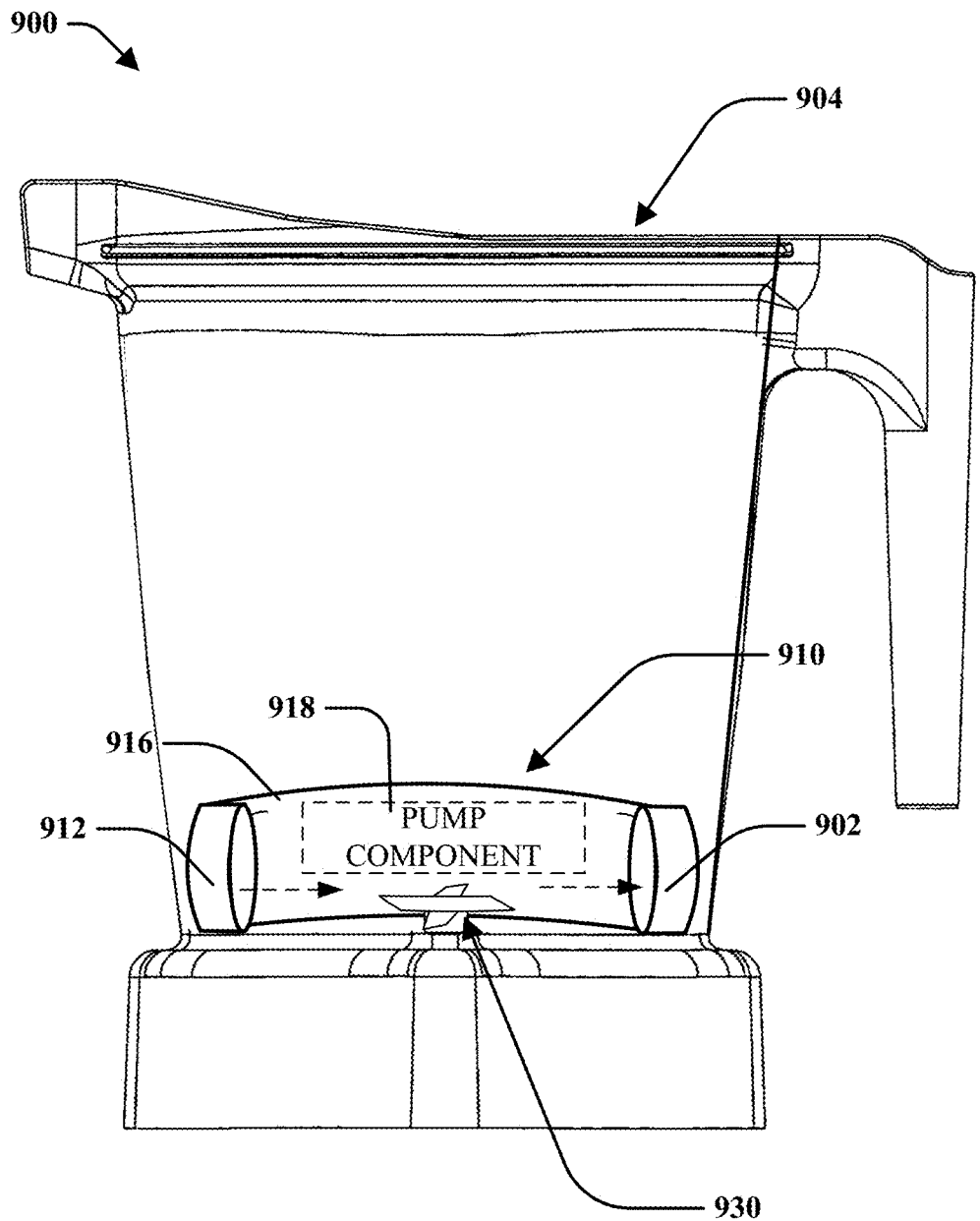
FIG. 9 is a side view of a blender system comprising a pump assembly, in accordance with various disclosed aspects.

With reference to FIG. 9, there is a blender system 900 in accordance with various disclosed aspects. As described herein, blender system 900 may include a blender container 904, a cutting blade 930, and a pump 910. In an aspect, pump 910 may comprise an inlet area 902 for receiving foodstuff, an outlet area 912 for exhausting foodstuff, and a pump component 918 which may force foodstuff from one position to another. The foodstuff may be drawn into inlet area 902, passed through a pump path or chamber 916, and pushed from outlet area 912. In an aspect, the pump component 918 may be positioned in the chamber 916, which may comprise a tube or other formation. It is noted that the pump component 918 may comprise various forms and may include fan blades that create lift, or other forms of pumps. In an aspect, the pump component 918 may cause foodstuff to flow and pass through a cut path of the cutting blade 930.

It is noted that the pump 910 may include one or more shearing apertures that may be formed on a surface of the chamber 916. In another aspect, one or more of the inlet area 902 or the outlet area 912 may comprise a grate that may comprise apertures formed for shearing foodstuff.

Chamber 916 may comprise a passage or pathway through blender container 904. For instance, the chamber 916 may be integrally formed with walls of the blender container 904. In another aspect, the chamber 916 may be formed of a separate construction that is attached to the blender container and/or positioned within the blender container. As described here as well as elsewhere in this disclosure, the chamber 916 may be configured as a handle that may extend from the blender container 904 and may be configured to direct foodstuff, as well as support movement of the blender container 904. It is noted that the chamber 916 may be configured to pass foodstuff to other containers or components. For instance, outlet area 912 may be comprised in a second container. As such, it is further noted that the pump 910 may comprise various configurations according to desired embodiments. Such configurations may be apparent through this description and the disclosed exemplary embodiments.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blender system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blender system comprising:
   a blender container comprising a first end and a second end;
   a shearing blade assembly disposed proximal to the second end of the blender container, the shearing blade assembly comprising:
      a shearing mechanism comprising at least one side wall comprising a plurality of apertures, an open end, and a closed end;
      a choke plate disposed proximal to the open end; and
      a shearing blade disposed within the shearing mechanism, wherein the shearing blade is configured to rotate about an axis,
   wherein rotation of the shearing blade operatively draws foodstuff into the open end and forces foodstuff out through the plurality of apertures to shear the foodstuff.

2. The blender system of claim 1, wherein the plurality of apertures are formed orthogonally through the at least one side wall.

3. The blender system of claim 1, wherein the plurality of apertures are formed at an angle other than orthogonally with the side wall.

4. The blender system of claim 1, wherein a first aperture of the plurality of apertures comprises at least one of a different shape, dimension, or angle of formation as a second aperture of the plurality of apertures.

5. The blender system of claim 1, wherein the shearing blade is disposed between the closed end of the shearing mechanism.

* * * * *